US008693012B2

(12) United States Patent
Mandel et al.

(10) Patent No.: US 8,693,012 B2
(45) Date of Patent: Apr. 8, 2014

(54) RUN COST OPTIMIZATION FOR MULTI-ENGINE PRINTING SYSTEM

(75) Inventors: Barry Paul Mandel, Fairport, NY (US); Saurabh Prabhat, Webster, NY (US); Martin Edward Banton, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1013 days.

(21) Appl. No.: 12/204,010

(22) Filed: Sep. 4, 2008

(65) Prior Publication Data
US 2010/0053664 A1    Mar. 4, 2010

(51) Int. Cl.
G06F 3/12       (2006.01)
G06F 15/00      (2006.01)
G06K 1/00       (2006.01)

(52) U.S. Cl.
USPC .......................... 358/1.13; 358/1.15; 358/1.9

(58) Field of Classification Search
CPC ..................................................... G06F 3/124
See application file for complete search history.

(56) References Cited

U.S. PATENT DOCUMENTS

| 4,579,446 A | 4/1986 | Fujino |
| 4,587,532 A | 5/1986 | Asano |
| 5,095,369 A | 3/1992 | Ortiz |
| 5,287,194 A * | 2/1994 | Lobiondo ..................... 358/296 |
| 5,326,093 A | 7/1994 | Sollitt |
| 5,389,969 A | 2/1995 | Suzuki |
| 5,489,969 A | 2/1996 | Soler |
| 5,568,246 A | 10/1996 | Keller |
| 5,570,172 A | 10/1996 | Acquaviva |
| 5,596,416 A | 1/1997 | Barry |
| 5,995,721 A | 11/1999 | Rourke |
| 6,094,546 A * | 7/2000 | Nakazato et al. ................. 399/1 |
| 6,327,050 B1 | 12/2001 | Motamed et al. |
| 6,554,276 B2 | 4/2003 | Jackson |
| 6,607,320 B2 | 8/2003 | Bobrow |
| 6,618,167 B1 | 9/2003 | Shah |
| 6,654,136 B2 | 11/2003 | Shimoda |
| 6,718,878 B2 | 4/2004 | Grosso |
| 7,081,969 B1 | 7/2006 | Motamed et al. |
| 7,308,218 B2 | 12/2007 | Roof |

(Continued)

FOREIGN PATENT DOCUMENTS

CN     1740960 A      3/2006
EP     1 630 663 A2   8/2005

(Continued)

OTHER PUBLICATIONS

1991, "Xerox Disclosure Journal" publication of Nov.-Dec. 1991, vol. 16, No. 6, pp. 381-383 by Paul F. Morgan.

(Continued)

Primary Examiner — Ming Hon
(74) Attorney, Agent, or Firm — Fay Sharpe LLP

(57) ABSTRACT

In accordance with one aspect of the present exemplary embodiments, a method for scheduling at least one print job for a plurality of printers of a given type is provided. The method includes determining a job length for the at least one print job. The method further includes scheduling a sequence of printing by the plurality of printers based the job length such that a subset of the available plurality of printers is cycled up, and printing the at least one print job with the subset of available printers when the job length is less than at least one predeterminable threshold.

20 Claims, 4 Drawing Sheets

(56) References Cited

U.S. PATENT DOCUMENTS

| | | |
|---|---|---|
| 2004/0085561 A1 | 5/2004 | Fromherz |
| 2004/0085567 A1 | 5/2004 | Lamotte |
| 2004/0088207 A1 | 5/2004 | Fromherz |
| 2006/0039026 A1* | 2/2006 | Lofthus et al. ............... 358/1.15 |
| 2006/0279775 A1* | 12/2006 | Matsumoto et al. ......... 358/1.15 |
| 2007/0229879 A1* | 10/2007 | Harmon et al. .............. 358/1.15 |

FOREIGN PATENT DOCUMENTS

| | | |
|---|---|---|
| JP | H07-177307 | 7/1995 |
| JP | H08-289053 A | 11/1996 |
| WO | WO 01/65352 A2 | 9/2001 |

OTHER PUBLICATIONS

Xerox Aug. 3, 2001 "Tax" publication product announcement entitled: "Cluster Printing Solution Announced".

U.S. Appl. No. 11/137,634 published Nov. 30, 2006.

U.S. Appl. No. 11/137,251 published Nov. 30, 2006.

European Search Report dated Oct. 16, 2012 for EP09 16 916.4-1245/2161657.

* cited by examiner

RUN COST OPTIMIZATION FOR MULTI-ENGINE PRINTING SYSTEM

BACKGROUND

The present exemplary embodiment relates to a scheduling system. It finds particular application in conjunction with scheduling print jobs for optimizing run cost and improving reliability for multi-engine printing systems and will be described with particular reference thereto. However, it is to be appreciated that the present exemplary embodiment is also amenable to other like applications.

Electronic printing systems typically employ a scanner for scanning image-bearing documents and conversion electronics for converting the image to image signals or pixels. The signals are stored and are read out successively to a printer for formation of the images on photoconductive output media such as a photoreceptor. When a single or multiple print job is to be printed, a process known as "load balancing" is commonly implemented. Load balancing is the ability of a printer system to complete a printing job(s) using all the available print engines to complete the print job(s) in the least amount of time. A control system associated with the image output terminal (IOT) of the machine identifies that magnitude of the print job that has been scheduled and determines the number of print pages per print engine necessary to complete the print job. In some cases, the control system will enable several, or all, of the print engines to begin printing simultaneously in order to complete the job in the least amount of time while engaging the maximum number of resources (print engines) available.

U.S. Pat. No. 6,618,167 to Shah, the disclosure of which is incorporated herein by reference, provides a scheduling scheme to improve the productivity of printers, particularly color printers. The scheduling scheme accounts for difference in the rasterization execution time of some print jobs.

U.S. Pat. No. 5,095,369 to Ortiz, et al., incorporated herein by reference, discloses a method for enhancing productivity in an electronic printer incorporating finishing activities and operating in a job streaming mode. Printing and collating of sets of original scanned documents are controlled so that collated sets are successively presented by the printer to the finisher nearly coincident with conclusion of the finishing activity being accomplished for a current job. The system uses a predictive algorithm which is used to increase reliability of printer components by cycling down the printer between jobs in situations where the finishing activity for a current job requires an extraordinarily long time to complete compared with the cycle down/cycle up time of the printer.

Printing systems now being developed may employ multiple print engines for black, process (or full) color, and custom color (single color or monochrome) printing of selected pages within a print job. The following references, the disclosures of which are incorporated by reference in their entireties, variously relating to what have been variously called "parallel" printers, or "cluster printing" (in which an electronic print job may be split up for distributed higher productivity printing by different printers, such as separate printing of the color and monochrome pages), and "output merger" or "interposer" systems: U.S. Pat. No. 5,568,246 to Keller, et al., U.S. Pat. No. 4,587,532 to Asano, U.S. Pat. No. 5,570,172 to Acquaviva, U.S. Pat. No. 5,596,416 to Barry, et al.; U.S. Pat. No. 5,995,721 to Rourke et al; U.S. Pat. No. 4,579,446 to Fujino; U.S. Pat. No. 5,389,969 to Soler, et al.; a 1991 "Xerox Disclosure Journal" publication of November-December 1991, Vol. 16, No. 6, pp. 381-383 by Paul F. Morgan; and a Xerox Aug. 3, 2001 "TAX" publication product announcement entitled "Cluster Printing Solution Announced."

Intermittent use of xerographic printers, characterized by relatively frequent on-off cycles has been shown, statistically, to lead to higher run cost (cost per printed page) and lower reliability. As with the operation of a car, startup and stopping are much more stressful than constant operation. Using a printer casually for relatively short jobs is much more stressful, as measured by maintenance costs per page, than running the same printer more continuously.

Several multi-engine architectures have been proposed and implemented. One of the issues with multi-engine systems is that the additional cycle up/down stress due to shorter run lengths per printer can have a detrimental effect on the life of the photoreceptor (PR) or other elements. For example, if a 30 sheet job is run on a single engine system, the system will cycle up, print the job and then cycle down. The impact of the cycle up/down time on component life will be relatively small. However, if the same job is run on a two engine system, with each engine cycling up, printing roughly 15 sheets, and then cycling down, the relative impact of the cycle up/down time on the overall component life will be larger. This affect will be different on different marking engines depending upon their cycle up/down time. This affect will not be a significant factor if job queuing is used to keep multiple engine printing systems running for long periods of time, however it is desirable to identify a method to reduce the impact of this affect when shorter jobs are run.

BRIEF DESCRIPTION

In accordance with one aspect of the present exemplary embodiment, a method for scheduling at least one print job for a plurality of printers of a given type is provided. The method includes determining a job length for the at least one print job. The method further includes scheduling a sequence of printing by the plurality of printers based the job length such that a subset of the available plurality of printers is cycled up, and printing the at least one print job with the subset of available printers when the job length is less than at least one predeterminable threshold.

In accordance with another aspect of the present exemplary embodiment, a method for scheduling print jobs for a plurality of printers is provided. The method includes: for each print job, selecting a first printer to begin printing the print job, tracking at least one of the run time and number of sheets printed by the first printer and cycling up a second printer when one of the run time and number of sheets exceeds a first threshold limit, and printing the print job on the first printer and selectively the second printer.

In accordance with another aspect of the present exemplary embodiment, a method for scheduling print jobs for a plurality of printers is provided. The method includes, for each of a plurality of print jobs, determining a number of pages of the print job and transmitting the print job along to a print job scheduler. The method further includes scheduling a sequence of printing the plurality of print jobs by the plurality of printers based on determining at least one of the number of pages and an actual run time for each of the plurality of printers based on a number of pages of the print job compared to at least a first printer and its respective capacity print pages per minute, and comparing the at least one of the number of pages and the actual run time calculated for a first printer to the predeterminable threshold and adding sequentially additional printers to the available printers when the at least one of the number of pages and the actual run time after adding each additional sequential printer is greater than the predeterminable threshold.

The term "marking device" or "printer," as used herein, broadly encompasses various printers, copiers, or multifunction machines, xerographic or otherwise, unless otherwise defined in a claim.

A "printing assembly," as used herein incorporates a plurality of marking devices, and may include other components, such as finishers, paper feeders, and the like.

A "print job" or "document" is normally a set of related sheets, usually one or more collated copy sets copied from a set of original print job sheets or electronic document page images, from a particular user, or otherwise related. In the context of this disclosure a "print job" could consist of more than one document, the important aspect being that the related sheets will be printed in one continuous stream.

The term "print medium" herein refers to a usually flimsy physical sheet of paper, plastic, or other suitable physical print media substrate for images, whether precut or web fed.

The term "finisher" or "finishing station" as broadly used herein, is any post-printing accessory device such as an inverter, reverter, sorter, mailbox, inserter, interposer, folder, stapler, collater, stitcher, binder, over-printer, envelope stuffer, postage machine, output tray, or the like. In general, a finishing station can only process one document at a time.

The term "job output destination" is any post printing destination where the printed pages of a document are together, ordered in a sequence in which they can be assembled into in the finished document, such as a finisher or finishing station, as described above, or a temporary holding location.

DETAILED DESCRIPTION

A scheduling component for a printing system, to be described hereinafter, enables improvements in run costs, reduces negative effects of cycle up/down, and improves reliability of the printing system to be achieved by reducing the number of times a printer is cycled-up for a short run time for at least one of the printers, and in one embodiment, all of the printers in the printing system.

Run costs and reliability can be evaluated by studying the number of unscheduled maintenance visits for a printing system, or for a group of printing systems. Unscheduled maintenance visits are those which arise from a printing system failure, rather than through a planned maintenance schedule. From the data, an unscheduled maintenance rate (UMR) can be determined which is the average number of unscheduled maintenance visits per million prints (or other suitable number of prints). Data taken for a large number of printing systems has shown that generally, as the average monthly printing volume (AMPV) increases, the UMR decreases (i.e., reliability increases). Specifically, the customers who create larger AMPV are generally printing significantly longer jobs, thus increasing the average continuous runtime of the machine per job. The present scheduling system allows increases in reliability to be achieved in multi-engine printing systems, in terms of decreased UMR, without the increase being necessarily tied to a corresponding increase in the AMPV. For example, by scheduling the printing of jobs to minimize the number of times print engines are cycled up/down for relatively short run times or small print jobs, a higher reliability for the multi-engine printing system is achieved.

Figure 1:
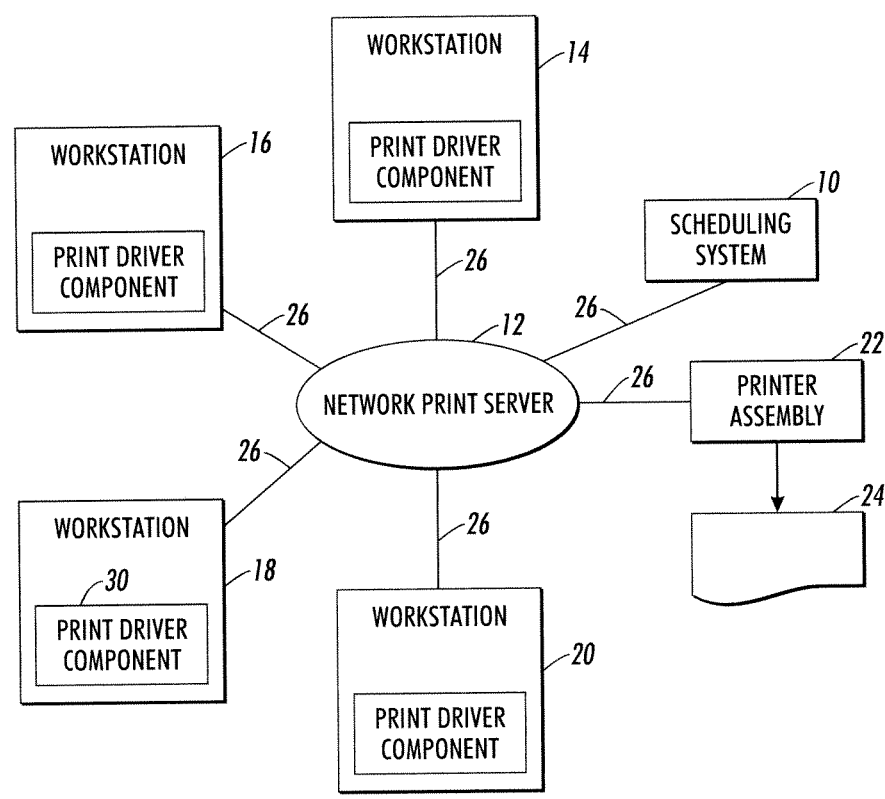
FIG. 1 is a schematic view of a printing system according to an exemplary embodiment.

With reference to FIG. 1, an exemplary networked printing system incorporating a document scheduling system 10 is shown. The networked printing system includes a network print server 12 and one or more workstations 14, 16, 18, 20 (four in the illustrated embodiment) and a printing assembly 22 capable of printing onto a print medium 24, all interconnected by links 26. The links 26 can be a wired or wireless link or other means capable of supplying electronic data to and/or from the connected elements.

Each of the workstations 14, 16, 18, 20 is associated with a print driver component 30. The print driver component 30 can pre-scan a print job, such as a document file and determines:

a) the total number of pages, including for example the number of pages of a first print modality to be printed on a first type of printer, e.g., the number of black only pages; and, b) the number of pages of a second print modality to be printed on a second type of printer, e.g., the number of custom color pages or process color pages.

Where more than two types of printer/type of print are available for use in the document, the print driver component 30 determines the number of pages of each type, for example, the print driver component can determine:

a) the number of black pages;
b) the number of process color pages; and, optionally,
c) the number of mixed modality pages.

Process color printers generally employ three inks, magenta, cyan, and yellow, and optionally black. Different colors are achieved by combinations of the three primary colors. Custom color printers are fed with a premixed ink which provides a specific color, generally with a higher color rendering accuracy than can be achieved with a process color printer. The number of modalities is not limited to those listed herein. In general, the print driver evaluates the number of pages of each print modality which is available for printing in the printer assembly.

While it is contemplated that marking devices may be capable of generating more than one type of print modality, for ease of reference, the marking devices described herein will be referred to as process color marking engines.

The print driver component 30 places the information regarding the number of pages of a print modality into a file header and sends it to the network server 12, along with the document file. The network print server 12 stores and spools the document file, including the file header. The print driver component 30 may alternatively convert a document file into a postscript print ready file. This postscript print ready file includes a header which the information on the number of pages of each print modality in the document. The postscript print ready file is then sent to the network print server 12.

In yet another embodiment, the network print server 12, rather than the print driver, identifies color and black only pages in a document. For example, the network print server includes software which identifies whether a page is a black and white page by examining data within the color separations for the page. Such a system is described, for example, in U.S. Pat. No. 6,718,878 to Grosso, et al., which is incorporated herein by reference.

The print job scheduler 10 receives the headers for a plurality of print jobs in a queue and orders them in a sequence, as will be described in greater detail below. The printing assembly 22 subsequently prints the jobs onto the print medium 24, e.g., sheets of paper, according to the scheduled sequence.

While the print driver component 30 is shown separately from the network print server 12 and printing assembly 22 it is appreciated that the print driver component could be incorporated into the particular network print server 12 or printing assembly 22. In general, FIG. 1 represents an embodiment in which the document scheduling system 10 is incorporated or otherwise connected to a networked printer environment. However, the document scheduling component 10 can be located anywhere.

The network print server 12 may include the document scheduling component 10 or the document scheduling component can be included in the printing assembly 22. The document scheduling component 10 is capable of scheduling the print jobs based on one or more of: minimizing short run times (below a predeterminable threshold), increasing the continuous running time of one or more marking devices, and minimizing the number of times one or more printers initiates a cycle up and cycle down (hereinafter all of which will be referred to as "run cost improvement factors" or RCIF) in the printing system and/or based on a custom scheduling scheme. The custom scheduling scheme may include a priority override feature, i.e. minimize overall run time for the print job, which allows the user to set a print priority regardless of the RCIF.

Figure 2:
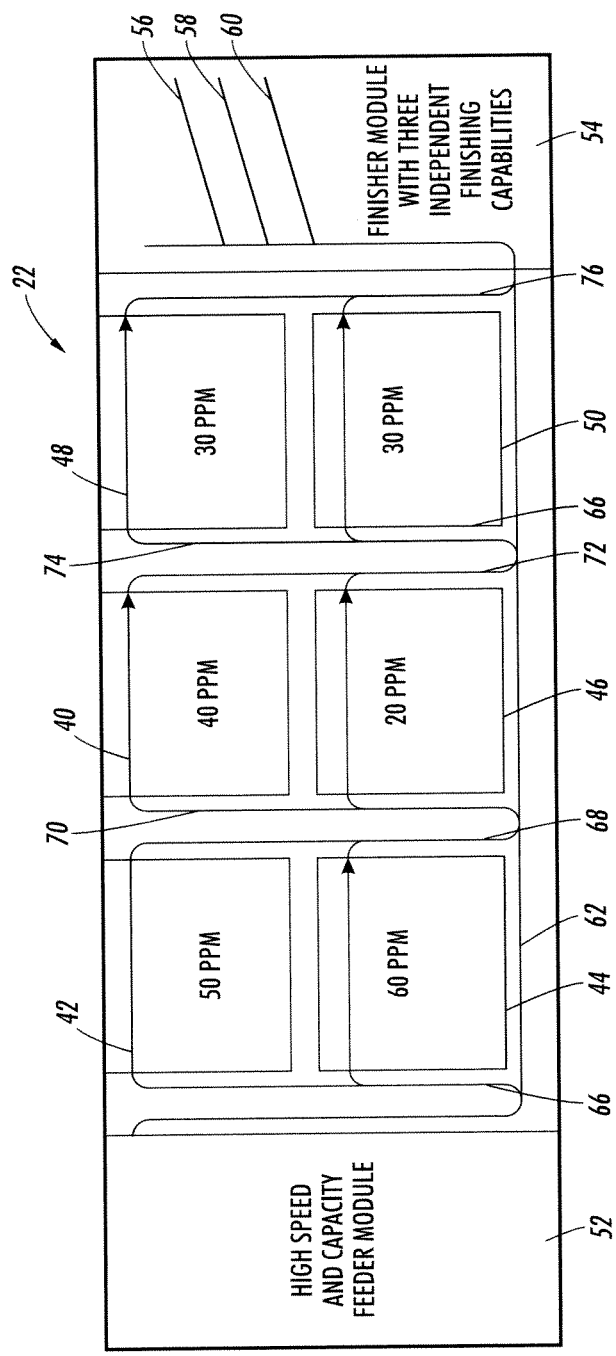
FIG. 2 is a schematic sectional view of a first embodiment of a printing assembly for the printing system of FIG. 1.

As shown in FIG. 2, the printing assembly 22 can include several printers, all communicating with the network print server 12. For example, a printing assembly 22 may consist of several identical or different, parallel printers connected through flexible paper paths that feed to and collect from these printers. At any one time, a plurality of the printers can be printing. More than one of the printers can be employed in printing a single print job. More than one print job can be in the course of printing at any one time. By way of example, a single print job may use one or more printers of a first modality (such as black only) and/or one or more printers of a second modality (such as process color).

FIG. 2 illustrates an exemplary printing system with color only printers 40, 42, 44, 46, 48, 50 (illustrated as 40 prints per minute (ppm), 50 ppm, 60 ppm, 20 ppm, 30 ppm, and 30 ppm printers, respectively). It will be appreciated that the printing system may include fewer or more printers, and/or different types of printers, depending on the anticipated print volume and system arrangements.

In the illustrated embodiment, all of the printers can be fed with print media from a single high speed and capacity feeder module 52, although it will be appreciated that one or more of the printers may be fed from separate feeders. A finisher module 54, with three separate finishing capabilities 56, 58, 60, here represented by output trays, receives printed media from any one of the clustered printers. A print media highway 62 extends from the feeder module 52 to the finisher module 54 from which pathways 66, 68, 70, 72, 74, 76, etc. feed the print media to and from selected ones of the printers. The highway 62 and/or pathways 66, 68, 70, 72, 74, 76 may include inverters, reverters, interposers, bypass pathways, and the like as known in the art to direct the print media between the highway and a selected printer or between two printers. It will be appreciated that the printers may be duplex or simplex printers and that a single sheet of paper may be marked by two or more of the printers or marked a plurality of times by the same printer, before reaching the finisher module.

The printing system with which the present scheduling system is used may incorporate "parallel" printers, "cluster printing," "output merger" or "interposer" systems, and the like, as disclosed, for example, in U.S. Pat. Nos. 5,568,246; 4,587,532; 5,570,172; 5,596,416; 5,995,721; 4,579,446; 6,654,136; and "Xerox Disclosure Journal" publication of November-December 1991, Vol. 16, No. 6, pp. 381-383 by Paul F. Morgan; and a Xerox Aug. 3, 2001 "TAX" publication product announcement entitled "Cluster Printing Solution Announced." One example of a sheet "interposer" is described in U.S. Pat. No. 5,489,969 to Soler, et al. Also noted are U.S. Pat. No. 6,554,276, to Jackson, et al., and U.S. Pat. No. 6,607,320, to Bobrow, et al., the systems of which can be used with the present scheduling system. By way of an example of a variable vertical level, rather than horizontal, "universal" input and output sheet path interface connection from a single printer to a single finisher which may be used, there is U.S. Pat. No. 5,326,093 to Sollitt. Sollit demonstrates additional possible optional input and/or output features which may be used here, since various different printers and third party finishers may have different sheet output levels and sheet input levels. All of the above-mentioned patents are incorporated herein by reference.

Having a plurality of printers 40, 42, 44, 46, 48, 50 capable of independent contemporaneous operation and capable of feeding printed pages to a common finisher module 54 enables a wide variety of scheduling options. For example, a single large print job of process color pages may be split between the printers, which feed selected pages to the same finisher, e.g., finishing station 56. Two or more print jobs may be printed contemporaneously by feeding the outputs of selected printers to different finishing stations. For example, a first job may use the first printer 40 to print some pages and the printer 48 to print other pages, their combined outputs being sent to the first finishing station 56, while the second print job may contemporaneously use the printer 42 and optionally printer 44 to print other pages with still other pages being printed on printer 46, the combined outputs of printers 42, 44, 46 being sent to a second finishing station 58. Since some of the pages may require different printing times, a fourth printing job may commence with use of one or more of the printers which has completed the pages for the first, second, or third print jobs while the rest of the printers are still occupied with the first second, or third print jobs.

The scheduling system 10 takes into account the different speeds of the printers, the finishing requirements, and the like in scheduling the print jobs. The scheduling system 10 may also determine a route for each sheet of each of the print jobs through the printing assembly so that the sheets arrive at the appropriate finishing station in the correct order for assembling the finished document.

Systems consisting of multiple parallel, alternative modules that are connected through flexible paths and even loops of the type illustrated in FIG. 2 offer a multitude of alternative operations to produce the same outputs. For previous, in-line systems with few alternative capabilities, the entire system was usually stopped when one of its modules (e.g., a printer) went off-line, perhaps when a fault occurred, except for specific modules, such as feeder modules in printing systems. With the types of parallel systems described above, it is possible to continue using all available system capabilities by planning and scheduling around the off-line module as necessary. For example, in the event that one of the printers goes off-line, the scheduling system reschedules the remaining print jobs in the queue to account for the off-line printer.

The network print server 12 and/or scheduling system 10 assigns the print job to the appropriate modality of printer (e.g., black only, process color, or custom color) selected by the workstation 14, 16, 18, or 20. Where there is more than one printer of a particular print modality, the document scheduling component 10 determines which printer to use, depending on the RCIF. The assigned printer's electronic subsystem (ESS), for example, can look at the header information and document and converts the document into a bitmap. Once the document is converted into a bitmap, the document is sent to the printer's image output terminal (IOT) and the printer starts printing the job or pages thereof.

The document scheduling component orders the jobs in the queue into a job sequence which takes into account the RCIF. Thus, the first job to arrive at the network print server could be the last job to be printed.

The document scheduling component schedules the printing of jobs from the queue of possible jobs to optimize one or more RCIF. In one embodiment, the document scheduling component examines the printing format requirements, e.g., black or process color for all pages of all jobs in the queue and creates a schedule for running jobs in the queue that minimizes or eliminates short runs, for example run times less than a predeterminable threshold duration, to minimize cycle up/down and resultant run costs for any one or all print engines.

U.S. Published Application Nos. 2004/0085561, 2004/0085567, and 2004/0088207 to Fromherz, published May 6, 2004, which are incorporated herein in their entireties by reference, disclose exemplary scheduling systems suited to use with a reconfigurable printing system. Such a scheduling system may be used to schedule the print sequence herein, by introducing constraints which minimizes run costs and/or minimizes on/off cycles of at least one, and in one embodiment, all printers in the printing assembly.

In one illustrative example of a load balancing print schedule (equal distribution of print job by page count), a print job of color only pages including 100 total pages can be processed as detailed below. The available printers can be established, for example, as printers 40, 42, and 44. If the print job is scheduled to all three printers in equal print portions, i.e. 33, 33, and 34 pages, then all three print engines would be cycled-up for processing. In this example, printer 44 would complete its 34 pages in 34 seconds, printer 42 would complete its 33 pages in 40 seconds, and printer 40 would complete its 33 pages in 50 seconds. Thus, the entire job, equally distributed (by page count) among all three printers would be completed in approximately 50 seconds with the printers 40, 42, 44 running for less than one minute and only one printer, i.e. printer 40, running the entire period to complete the print job. Alternatively, the print job can be distributed such that each printer runs for nearly the same amount of time. In the example above, if each printer ran for 40 seconds, based on their respective speeds, the entire print job would be completed with each printer processing a different portion of the total job.[0056] As another example, consider again the system of FIG. 2 with print engines 42, 44, 46 and 48, where now all four engines are color engines with printing capabilities of 50 ppm (for example). The present disclosure proposes altering the print job assignment, i.e. minimizing cycle up/down impact on run costs, to assign the print jobs such that the number of printers having a run length less than a threshold is minimized. Thus, if 100 simplex pages are scheduled and printers 42, 44, 46 and 48 are all available, the scheduler first proposes scheduling the complete job of 100 pages such that the job is split roughly equally across all four available print engines (42, 44, 46 and 48). Although this would print the job in the least amount of time, it would mean that each engine would print roughly 25 pages (the actual number will depend on the location of the engine within the system), which could have a negative impact on run cost. If a threshold has been set for the minimum run length of any given marking engine of i.e. 40 sheets, then this first scheduling option does not meet the threshold requirement and a schedule using a smaller number of marking engines would be evaluated. A schedule utilizing three of the marking engines results in each engine printing roughly 33 sheets which also does not meet the threshold requirement; however, a schedule using two of the marking engines results in each engine printing roughly 50 pages and does meet the threshold requirement. The above calculations results in the job being run using just two of the marking engines. The selection of which marking engines to be cycled up when jobs utilizing a subset of the available engines can be made such that the overall usage of the marking engines is balanced. It is to be appreciated that the logic described above is equivalent to defining a set of job size thresholds that could be used to determine the number of marking engines to use in printing the job or set of jobs. For example, if the minimum number of sheets to be printed on a single engine is 40, then any jobs less than 80 sheets would be printed using a single marking engine (note that it is always necessary to cycle up at least one engine, even if the job size is less than 40 sheets). Any jobs or set of continuous jobs less than 120 sheets would be printed using 2 marking engines. Any jobs or set of continuous jobs less than 160 sheets would be printed using 3 marking engines, and any that were 160 sheets or more would be printed using all four engines.

If the above job is to be run, but the number of sheets is not known before the job is started, the scheduler could be programmed to initiate the job with a subset of the available marking engines (ie, 1, 2 or 3 of the marking engines). For example, if the system is programmed to start the job with just one of the marking engines, and after printing 10 pages the job length information is communicated to the scheduling system, the scheduler then performs a similar calculation as described above for the 100 page job, however only the remaining 90 pages would be evaluated (the 90 page figure can actually be reduced slightly to take into account the additional pages printed by the first engine during the cycle-up time of any additional engines). As before, splitting the job across 3 or 4 engines would result in some engines printing less than the threshold number of pages, while printing with 2 engines would meet the threshold requirement. A second marking engine would therefore be cycled up and two marking engines would be used to print the remainder of the job. It should be noted that in this second scenario (in which the job length is not known initially) it is not necessary to always split the remaining pages equally across the 2 or more marking engines. If, for example, the first engine had already printed 30 pages before the length of the job became known to the scheduler, the scheduler can schedule 40 sheets for the second print engine that is cycled up and print the remaining 30 sheets on the first marking engine. This ensures that both engines printed at least the threshold number of 40 pages. If the job length does not become available when the printing system has printed a predeterminable threshold number of prints, one or more additional printers can be cycled up and used to help continue printing the job. In this case, it is possible that the additional printer or printers will end up printing a small number of sheets, however this approach will always ensure that at least the first printer will print at least a predeterminable number of prints and this approach will minimize the number of times that a large number of printers is cycled up to print a small size job.

In another example using alternatively printer run time as the threshold, if 100 pages are scheduled and printers 40, 42, and 44 of FIG. 2 are available with printing capabilities now of 40 ppm, 50 ppm, and 60 ppm, respectively, the scheduler first proposes scheduling the complete job of 100 pages for printer 40. If printer 40 does the compete job of 100 pages, it would take 150 seconds. If a threshold for each printer is predetermined to be 60 seconds, then this job exceeds the threshold time and then another printer would be proposed or enlisted for printing, assuming the threshold of both printers would not be below the threshold time. In the example above, printer 42 could be activated. If both printers 40 and 42 were running, the print job could be divided between printers 40 and 42. Printer 42 would complete its 50 pages in 60 seconds. Printer 40 would complete its 50 pages in 75 seconds. Therefore, each printer is running for not less than the threshold time and the complete job would take approximately 75 seconds. This job assignment proposes minimizing the number of times a printer is cycled up without running for a predetermined threshold run time.

Considering the example above, one assignment resulted in each printer run time less than the threshold of 60 seconds and the job taking 50 seconds, or 40 seconds, depending on page or run time distribution, respectively. In another assignment, only two printers are activated, which saves the third engine from cycling-up, and the total job taking 75 seconds, or approximately 67 seconds, depending on page or run time distribution, respectively. If optimizing run cost is more critical then optimizing run time, then the second assignment is selected for this print job.

Minimizing short run times can follow the above described methods wherein the maximum number of printers is enlisted to complete a print job, i.e. a print job of known size, such that each printer does not run for less than a predetermined threshold period of time. The 'maxmin' method provides for the maximum printer capacity associated with at least a minimum run time. The associated minimum run time can be different for each printer based on its respective print speed in pages per minute (ppm). As described above, the aforementioned method allows a user to override any RCIF generated priority. For example, if a user has an important print job, the custom priority scheme will allow this particular print job to be processed using all available printers to minimize overall run time regardless of the run time per printer and the effect on RCIF. The custom priority scheme can look at any override flags that may be set and schedule jobs accordingly.

Distributing print jobs, sub-jobs, and/or portions of print jobs can include optimizing one or more RCIF. Each sub-job can include one or more individual print portions selected from a queue. The maximum number of print portions which can be performed contemporaneously can depend on the number of available finishing stations, but may also be influenced by the number of printers (x) of each print modality in the printing assembly and/or the number of pages of each type of print modality in the particular job. For example, where there are three finishing stations, as shown in FIG. 2, the maximum number of jobs which can generally be bundled into a sub-job is three. The sub-jobs can be assembled into a schedule to optimize one or more RCIF. For example, using relatively standard optimization routines, the jobs are clustered into sub-jobs and the sub-jobs are ordered to enlist the maximum number of printers that will run for more than a threshold period in order to complete the job, or, conversely, to minimize on-off cycles for each printer. Determining which print jobs to bundle into a sub-job and which order to sequence the sub-jobs can be determined by an iterative process in which the scheduling system proposes a number of sub-jobs to accommodate all print jobs in the queue and places the sub-jobs in a sequence and evaluates one or more of the RCIFs.

As shown in FIG. 1, the document scheduling system 10 can be implemented either on a single program general purpose computer or separate program general purpose computer. However, the document scheduling system can also be implemented on a special purpose computer, a programmed microprocessor or microcontroller and peripheral integrated circuit element, an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the method can be used to implement the document scheduling system.

The disclosed method may be readily implemented in software using object or object-oriented software development environments that provide portable source code that can be used on a variety of computer or workstation hardware platforms. Alternatively, the disclosed document scheduling system may be implemented partially or fully in a hardware using standard logic circuits or VLSI design. Whether software or hardware is used to implement the systems in accordance with the exemplary embodiments is dependent on the speed and/or efficiency requirements of the system, the particular function, and the particular software or hardware systems or microprocessors or microcomputer systems being utilized. The document scheduling system and methods described above, however, can be readily implemented in hardware or software using any suitable systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of the exemplary embodiments described herein can be implemented as a routine embedded on a personal computer such as Java® or CGI script, as a resource residing on a server or graphics work station, as a routine embedded in a dedicated print management system, web browser, web TV interface, PDA interface, or the like. The document RCIF scheduling system can also be implemented by physically incorporating the system and method into a software and/or hardware system, such as the hardware and software of a graphics workstation or dedicated print management system.

In one embodiment, the scheduling system can be adapted to use with a variety of different printing systems. For example, the scheduling system may be programmed to receive inputs on the number, print modality, and configuration of the printers, and finishing stations in the printer assembly. The scheduling system thus can be programmed to modify the optimization routine according to the number of printers of each modality, their print capabilities, in terms of ppm, the number of finishing stations, and the like.

By way of illustration, another alternative scheduling arrangement can be implemented for a printing system. In the alternative scheduling arrangement, particularly suitable for job lengths of unknown length, a print job or sub-job can be scheduled initially for one printer. The assignment of the single printer can be done on a rotating basis in order to 'balance' which printer is cycled-up. Once the first printer is cycled-up and processing the print job, a timer or counter can be initiated and when the first printer run time or counter exceeds a threshold (t if a time), then another printer is cycled-up to assist with processing the print job. In turn, other printers can be cycled-up sequentially as the threshold time or count is exceeded for each additional printer (i.e. 1×t, 2×t, 3×t, 4×t, . . . n×t). For example, once the first threshold time or count is exceeded (1×t), for the first printer, then a second printer will be cycled-up. Once the run time or count exceeds two times the threshold (2×t), then a third printer will be cycled-up, etc. It should be appreciated that the thresholds do not need to be integer multiples of the first threshold as shown in this example and that the above example is just one of many ways in which predeterminable thresholds can be calculated.

Figure 3:
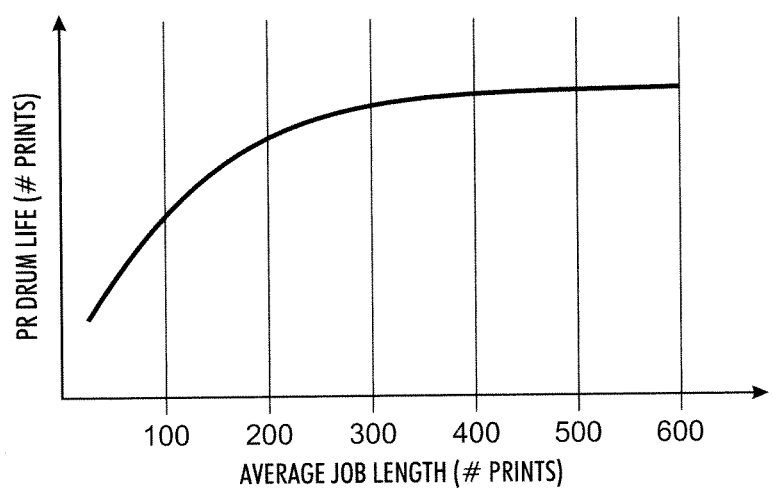
FIG. 3 shows how the life of a photoreceptor (PR) drum changes based upon the average job length, i.e. the negative effects of cycle up/down; and, FIG. 4 shows an exemplary flow chart describing one possible logic and control sequence according to the present disclosure.

Using the example above for a 100 page print job starting with printer 40 would result in the following. Printer 40 would begin printing the entire print job of 100 pages. At one minute (i.e. threshold of 60 seconds), 40 pages would have been completed. A second printer, i.e. 42, would then be cycled-up with 60 pages remaining in the print job. With both printers 40, 42 now running, the remaining 60 pages would be printed in approximately t seconds ([40 ppm×t]+[50 ppm×t]=60 pages). In this example, printer 40 would run for 100 seconds and printer 42 would run for 40 seconds. The 100 pages would be processed by only two printers with only one of the printers running for less than a threshold of 60 seconds. In this example, printer 40 would process 67 pages and printer 42 would process 33 pages. The next print job could be scheduled to be processed starting with printer 44, i.e. start printing process with the next sequential printer that was not utilized in the previous print job. The aforementioned alternative arrangement presents another method for job scheduling and load balancing (i.e. sequentially alternating initial printer at start of print job). FIG. 3 shows how the life of a photoreceptor (PR) drum changes based upon the job length, i.e. the negative effects of cycle up/down.

Figure 4:
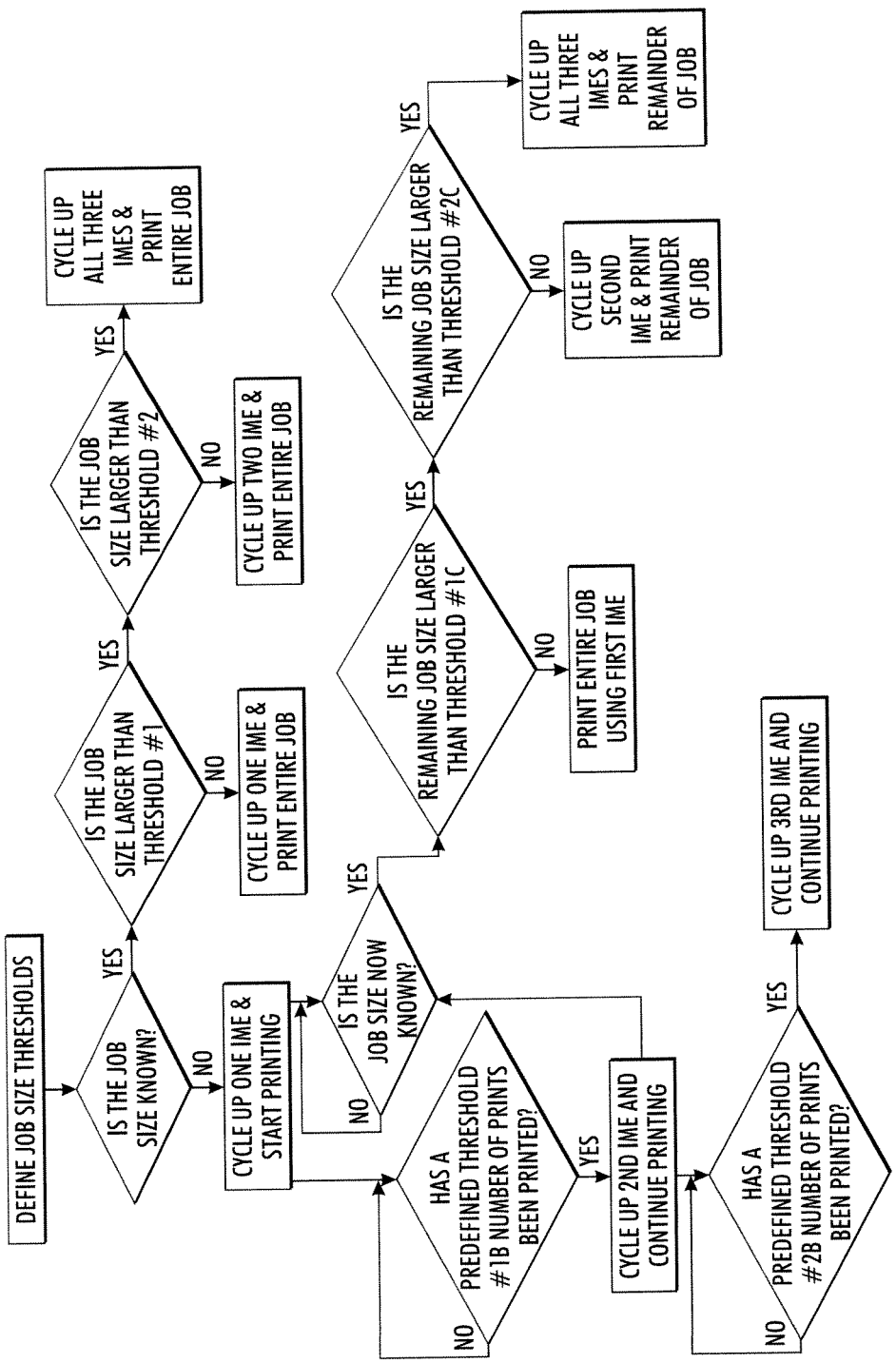

In summary, this application has described several methods of reducing the run cost in multi-engine systems. If the number of sheets in a given job can be determined before the print job is started then that information can be used to determine how many print engines will be cycled up and used to print the job. This is done by comparing the print job length to some predefined or predeterminable thresholds. These thresholds can vary from job to job based on sheet size, engine cycle up time, operator input, and other factors. If the number of sheets in a given print job is not known when the print job is started, then a single print engine or a subset of the available print engines can be used to initiate the print job. After a specified number of prints have been made, one or more of the other available print engines are cycled up and also used to complete the print job. In some cases, a hybrid of these two approaches can be used. The job would start printing using a single engine or subset of the available engines, and as soon as the job length information became available, the scheduler can define the number of engines to use and optionally cycle up additional engines if the job length exceeded the predefined thresholds. A flow chart showing how these methods can be combined is shown in FIG. 4. Note that the predeterminable job length thresholds that trigger the use of a second or third marking engine could optionally be different depending on whether or not the job length is known before the job starts.

It should be borne in mind that the alternative scheduling arrangements provide possible command sets. One skilled in the art would readily appreciate that individual instructions could be varied in form and that the sequence in which steps are performed could vary, all of which embodiments are contemplated by the disclosure and scope of the claims herein.

The exemplary embodiments have been described with reference to the disclosure. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for scheduling at least one print job for a plurality of printers, the method comprising:
determining a job length for said at least one print job;
scheduling a sequence of printing by the plurality of printers based on said job length such that a subset of the available plurality of printers is cycled up;
printing said at least one print job with said subset of available printers;
wherein said subset of available printers is a maximum number of the available plurality of printers each having a run length for at least a minimum first predeterminable threshold; and,
said minimum first predeterminable threshold is a duration of time greater than zero.

2. The method of claim 1, wherein said subset of available printers includes only a first printer to print said at least one print job when said job length is above said minimum first predeterminable threshold and below a second predeterminable threshold.

3. The method of claim 2, wherein said subset of available printers includes said first printer and a second printer to print said at least one print job when said job length is above said second predeterminable threshold and below a third predeterminable threshold.

4. The method of claim 1, wherein said minimum first predeterminable threshold is defined based on printer run time of the available plurality of printers in a system.

5. The method of claim 4, wherein said minimum first predeterminable threshold is a factor of the cycle-up time of at least one of the printers.

6. The method of claim 1, wherein said minimum first predeterminable threshold is defined based on an input from the operator of the printing system.

7. The method of claim 1 wherein all of the available plurality of printers are of the same type, and wherein the type is selected from the group consisting of color printers and monochrome printers.

8. The method of claim 1, wherein said minimum first predeterminable threshold is a factor of the capacity print pages per minute of at least one of the printers.

9. The method of claim 8, further comprising determining a first run time of each of the plurality of printers based on said job length of said at least one print job compared to at least a first printer and its respective capacity print pages per minute and at least a second printer and its respective capacity print pages per minute.

10. The method of claim 9, further comprising comparing said first run time calculated for said first printer to said minimum first predeterminable threshold and adding at least said second printer to the available plurality of printers when said first run time for said first printer is greater than two times said minimum first predeterminable threshold run time.

11. The method of claim 10, further comprising comparing a second run time calculated for a third through x printers to said minimum first predeterminable threshold and adding sequentially said third through x printers to the available printers when said second run time is greater than at least three times said minimum first predeterminable threshold run time.

12. The method of claim 11, wherein said minimum first predeterminable threshold run time is a factor of the cycle time of a printer.

13. The method of claim 12, wherein said minimum first predeterminable threshold run time is a factor of the capacity print pages per minute of each of the printers.

14. The method of claim 13, wherein x includes the total number of printers available in a printer system.

15. A method for scheduling print jobs for a plurality of printers, the method comprising:
    for each of a plurality of print jobs, including: determining a number of pages of the print job; transmitting the print job along to a print job scheduler; scheduling a sequence of printing the plurality of print jobs by the plurality of printers based on determining at least one of the number of pages and actual run time for each of the plurality of printers based on a number of pages of the print job compared to at least a first printer and its respective capacity print pages per minute; comparing at least one of the number of pages and the actual run time calculated for a first printer to the predeterminable threshold and adding sequentially additional printers to the available printers when at least one of the number of pages and the actual run time after adding each sequential additional printer is greater than the predeterminable threshold;
    wherein a total number of printers added is a maximum number selected from the plurality of printers each having a run time for at least the predeterminable threshold and, said predeterminable threshold is a duration of time greater than zero.

16. A method for scheduling print jobs for a plurality of printers, the method comprising: for each print job, selecting a first printer to begin printing the print job, tracking the run time by the first printer and cycling up only a second printer when the run time is greater than two times a threshold limit and less than three times said threshold limit; printing the print job on the first printer and selectively the second printer; and, wherein said threshold limit is a duration of time greater than zero.

17. The method according to claim 16, in which the first printer is selected on a rotating basis.

18. The method according to claim 16, further comprising for the print job, tracking the run time by the first printer and the second printer and cycling up a third printer when the run time exceeds said three times said threshold limit, and printing the print job on the first, second, and third printers.

19. The method according to claim 16, further comprising for the print job, tracking the run time by the first printer and the second printer and cycling-up individual additional printers sequentially in a selected order each time the run time exceeds another additional factor of said threshold limit, and printing the print job on the first, second, third, and additional printers.

20. The method according to claim 16, wherein when information about the job length becomes available during the print job, the job length information is used by the scheduling system to cycle up additional printers if a remaining job length is above said threshold limit.

* * * * *